(12) United States Patent
Kim

(10) Patent No.: US 12,512,718 B2
(45) Date of Patent: Dec. 30, 2025

(54) MOTOR

(71) Applicant: LG INNOTEK CO., LTD., Seoul (KR)

(72) Inventor: Jae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 200 days.

(21) Appl. No.: 18/286,865

(22) PCT Filed: Apr. 13, 2022

(86) PCT No.: PCT/KR2022/005361
§ 371 (c)(1),
(2) Date: Oct. 13, 2023

(87) PCT Pub. No.: WO2022/220588
PCT Pub. Date: Oct. 20, 2022

(65) Prior Publication Data
US 2024/0195260 A1    Jun. 13, 2024

(30) Foreign Application Priority Data

Apr. 13, 2021   (KR) .......................... 10-2021-0047831

(51) Int. Cl.
*H02K 5/16* (2006.01)
*H02K 7/00* (2006.01)
*H02K 7/08* (2006.01)

(52) U.S. Cl.
CPC .............. *H02K 5/16* (2013.01); *H02K 7/003* (2013.01); *H02K 7/08* (2013.01)

(58) Field of Classification Search
CPC ............. H02K 5/16; H02K 7/003; H02K 7/08
See application file for complete search history.

(56) References Cited

U.S. PATENT DOCUMENTS 4,048,530 A * 9/1977 Kaufman, Jr. ........... H02K 5/08
310/90

FOREIGN PATENT DOCUMENTS

| DE | 102018200865 A1 | * 7/2019 | ............... H02K 9/19 |
| KR | 19990039148 | * 11/1999 | ............... H02K 5/04 |
| KR | 10-0478419 | 3/2005 | |
| KR | 10-2011-0010231 | 2/2011 | |
| KR | 10-1188096 | 10/2012 | |
| KR | 10-2016-0089784 | 7/2016 | |
| KR | 10-2020-0010524 | 1/2020 | |

OTHER PUBLICATIONS

International Search Report dated Aug. 1, 2022 issued in Application No. PCT/KR2022/005361.

* cited by examiner

*Primary Examiner* — Terrance L Kenerly
(74) *Attorney, Agent, or Firm* — KED & ASSOCIATES, LLP

(57) ABSTRACT

The present invention may provide a motor including a shaft, a rotor coupled to the shaft, a stator disposed to correspond to the rotor, a bearing which supports the shaft, and a shaft guide which supports the bearing, wherein the shaft guide includes a first groove in which the shaft is disposed, an outer surface of the shaft guide includes a first surface and a second surface, the first surface is in contact with an inner circumferential surface of an inner ring of the bearing, the second surface is in contact with one surface of the inner ring of the bearing, and the shaft guide includes a second groove which is disposed in a bottom surface of the first groove.

9 Claims, 7 Drawing Sheets

[FIG. 1]
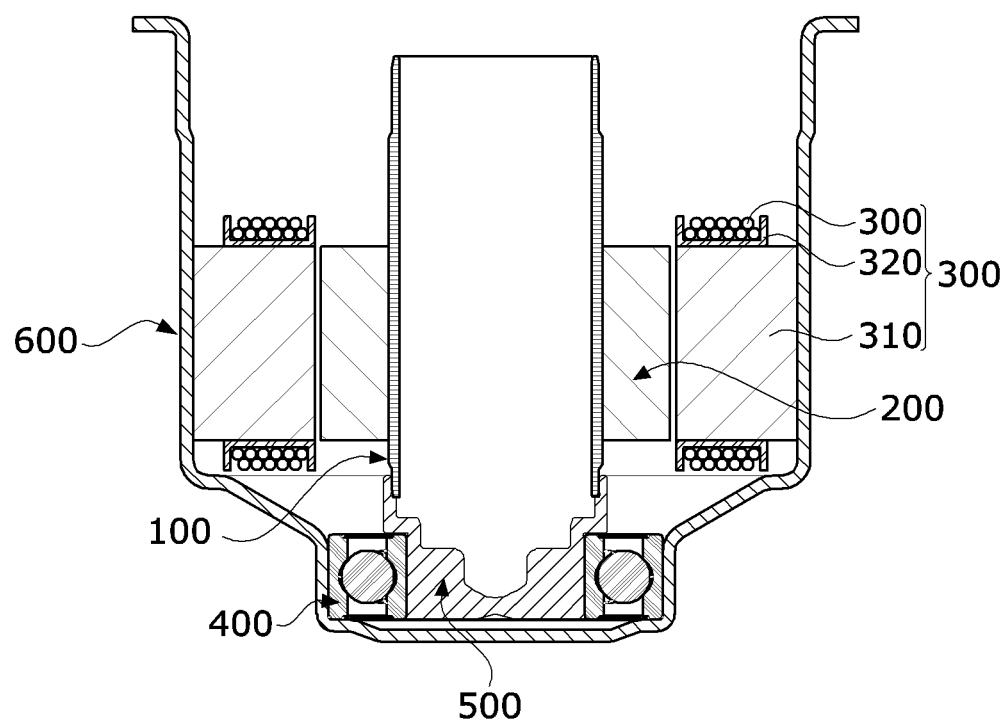

[FIG. 2]
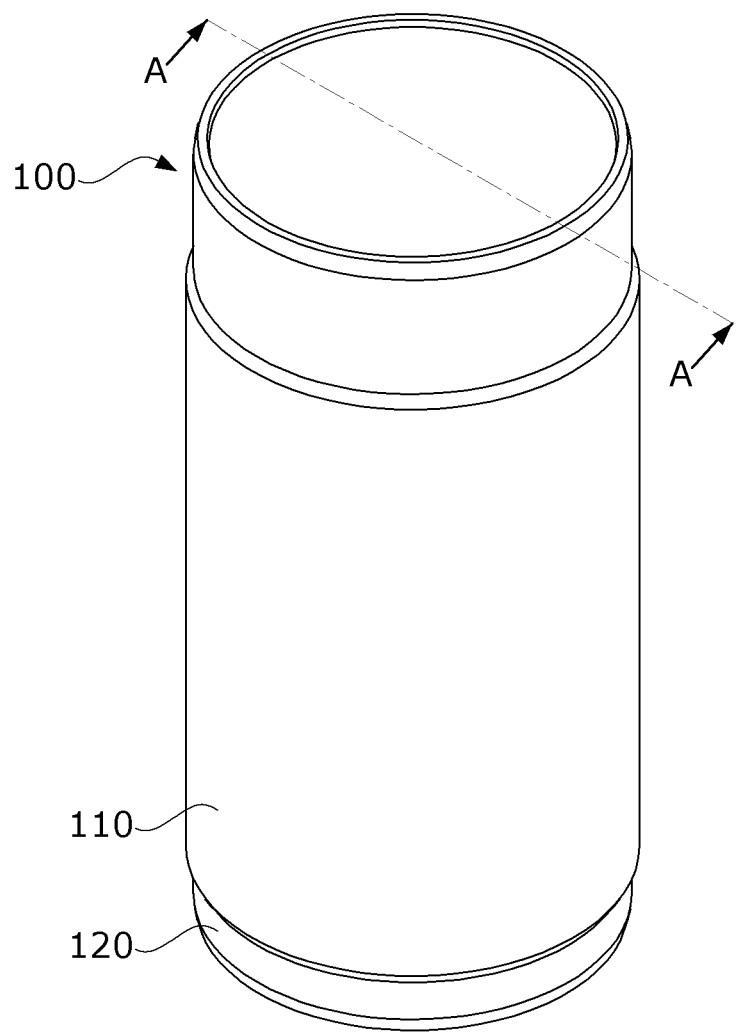

[FIG. 3]
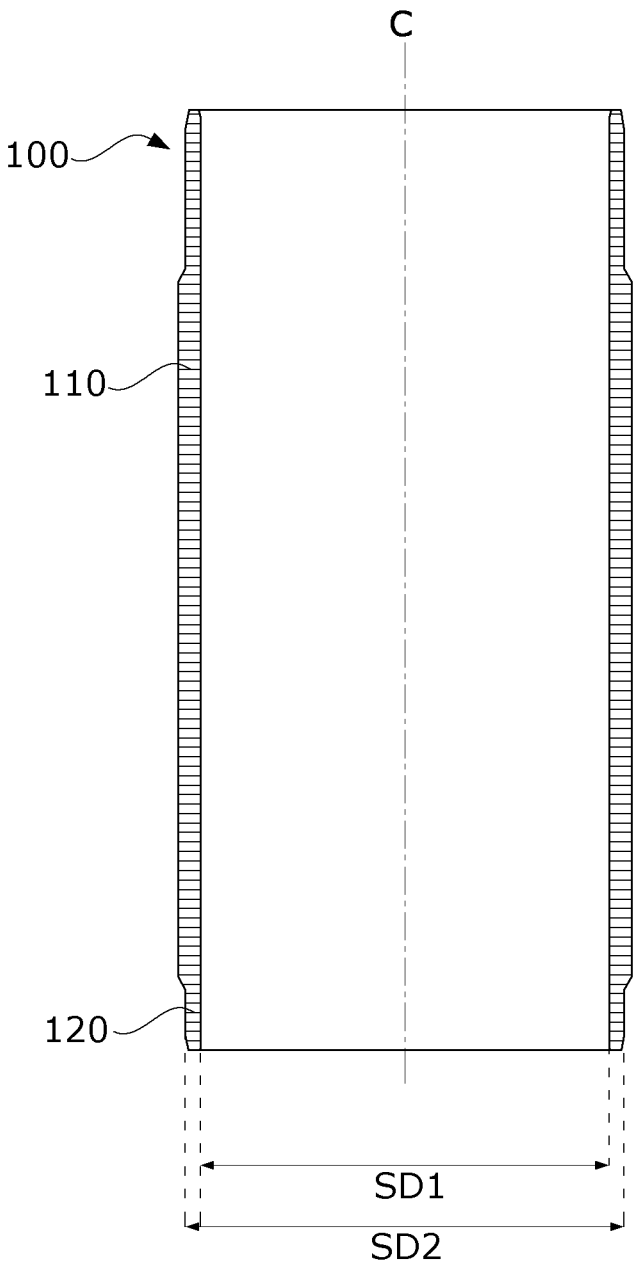

[FIG. 4]
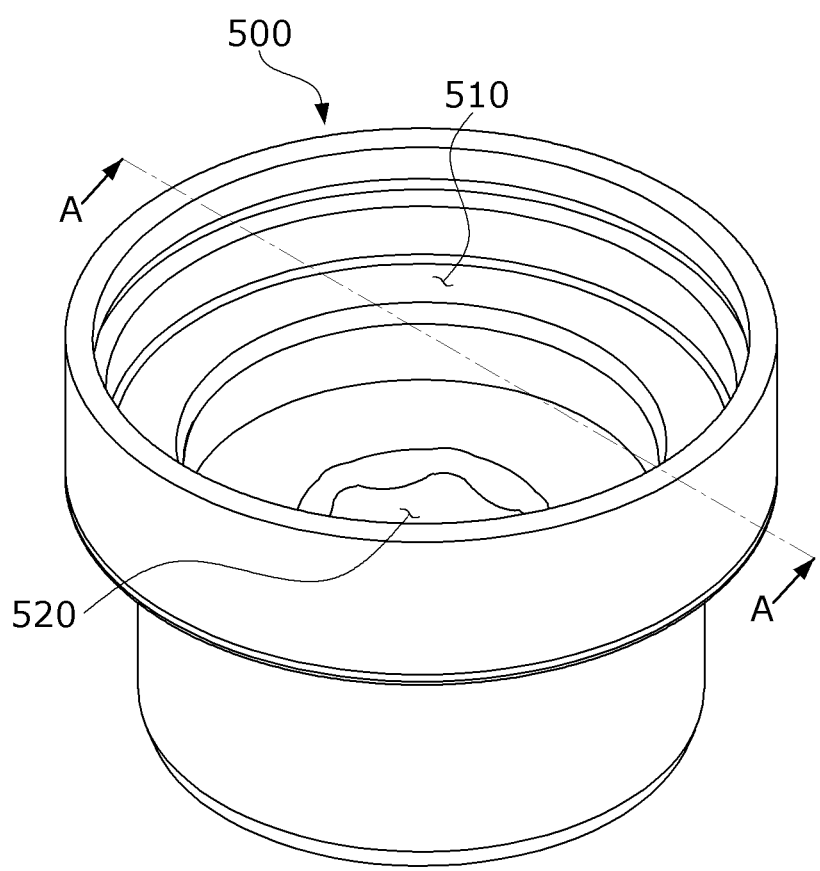

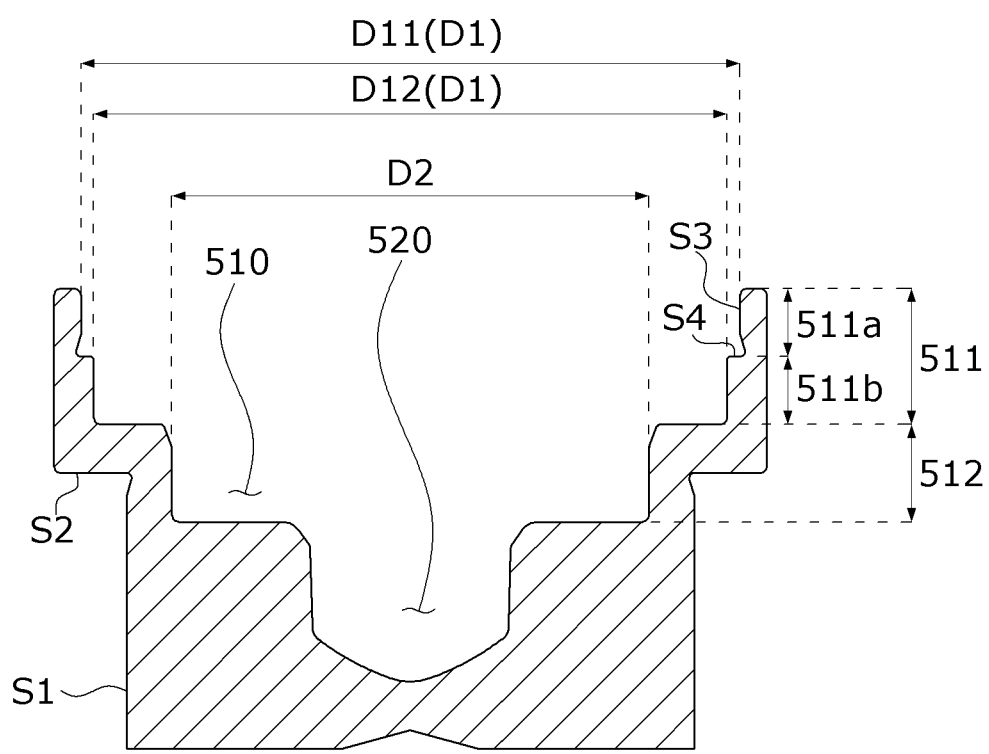
[FIG. 5]

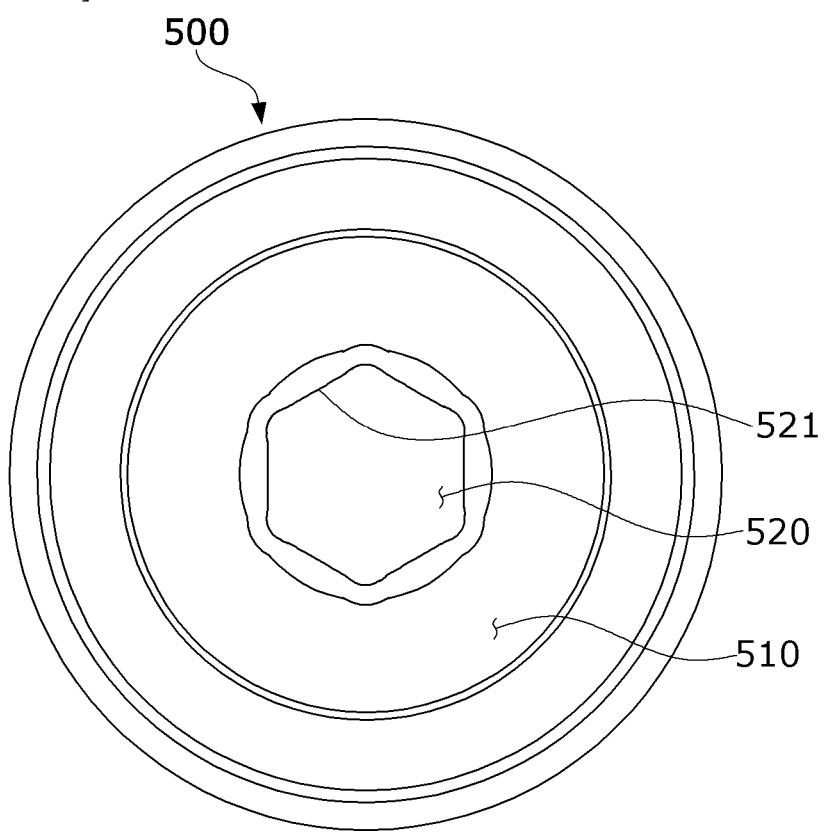
[FIG. 6]

[FIG. 7]
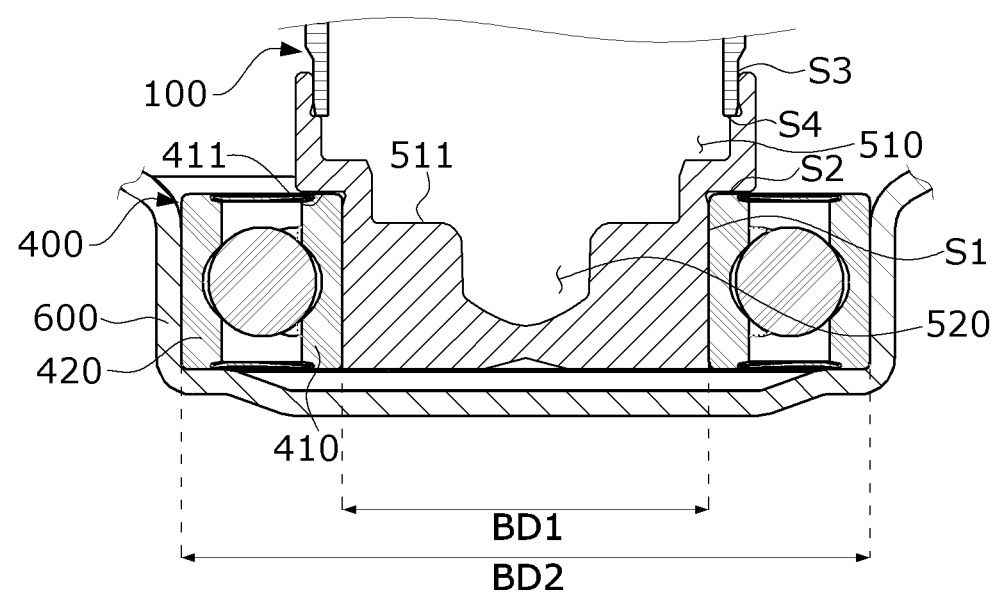

MOTOR

CROSS-REFERENCE TO RELATED PATENT APPLICATIONS

This application is a U.S. National Stage Application under 35 U.S.C. § 371 of PCT Application No. PCT/KR2022/005361, filed Apr. 13, 2022, which claims priority to Korean Patent Application No. 10-2021-0047831, filed Apr. 13, 2021, whose entire disclosures are hereby incorporated by reference.

TECHNICAL FIELD

The present invention relates to a motor.

BACKGROUND ART

A motor includes a shaft, a rotor, and a stator. The rotor and the stator are accommodated in a housing. The stator may include a stator core and a coil wound around the stator core.

The shaft may be a hollow member. Bearings which support the shaft may support one side and the other side of the shaft. In this case, one side of the shaft is coupled to a bearing housing, and the bearings may support the bearing housing.

Meanwhile, a spindle of an external device may be connected to an inner side of the shaft. Accordingly, a separate device for supporting the spindle should be provided in the housing of the motor. In order to provide the device which supports the spindle of the external device, there is a problem that the number of components increases inevitably, and a manufacturing process of the motor becomes complicated.

DISCLOSURE

Technical Problem

Accordingly, the present invention is directed to providing a motor in which the number of components is reduced and a manufacturing process of the motor is simplified while supporting a spindle of an external device connected to an inner side of a shaft.

Technical Solution

One aspect of the present invention provides a motor including a shaft, a rotor coupled to the shaft, a stator disposed to correspond to the rotor, a bearing which supports the shaft, and a shaft guide which supports the bearing, wherein the shaft guide includes a first groove in which the shaft is disposed, an outer surface of the shaft guide includes a first surface and a second surface, the first surface is in contact with an inner circumferential surface of an inner ring of the bearing, the second surface is in contact with one surface of the inner ring of the bearing, and the shaft guide includes a second groove which is disposed in a bottom surface of the first groove.

Advantageous Effects

According to an embodiment, as a shaft guide in which a bearing is mounted is used as a structure which supports a spindle of an external device entering an inner side of a shaft, there are advantages that the number of components can be reduced, and a manufacturing process of a motor can be simplified.

According to an embodiment, as an outer surface of a shaft guide is used as a region which supports a bearing, and an inner surface of the shaft guide is used as a structure which supports a spindle of an external device, there is an advantage that a structure which supports the spindle of the external device can be easily formed.

According to an embodiment, since a component which supports a bearing is equal to a component which supports a spindle of an external device, there are advantages that strength is improved, and management is easy.

DESCRIPTION OF DRAWINGS

FIG. 1 is a view illustrating a motor according to an embodiment.

FIG. 2 is a view illustrating a shaft illustrated in FIG. 1.

FIG. 3 is a side cross-sectional view illustrating the shaft along line A-A of FIG. 2.

FIG. 4 is a perspective view illustrating a shaft guide illustrated in FIG. 1.

FIG. 5 is a side cross-sectional view along line A-A of FIG. 4.

FIG. 6 is a plan view illustrating the shaft guide illustrated in FIG. 4.

FIG. 7 is a side cross-sectional view around the shaft guide.

MODES OF THE INVENTION

A direction parallel to a longitudinal direction (vertical direction) of a shaft is referred to as an axial direction, a direction perpendicular to the axial direction of the shaft is referred to as a radial direction, and a direction along a circle having a radius in the radial direction about the shaft is referred to as a circumferential direction.

FIG. 1 is a view illustrating a motor according to an embodiment.

Referring to FIG. 1, the motor according to the embodiment may include a shaft 100, a rotor 200, and a stator 300. Hereinafter, the term "inward" is a direction from a housing 600 toward the shaft 100 which is a center of the motor, and the term "outward" is a direction opposite to "inward," that is, a direction from the shaft 100 toward the housing 600. In addition, a radial direction is defined based on an axial center of the shaft 100.

The shaft 100 may be coupled to the rotor 200. When an electromagnetic interaction occurs between the rotor 200 and the stator 300 due to a supplied current, the rotor 200 rotates and the shaft 100 rotates in conjunction with the rotation of the rotor 200. The shaft 100 may be a hollow member. A spindle of an external device may enter an inner side of the shaft 100.

The rotor 200 rotates through an electrical interaction with the stator 300. The rotor 200 may be disposed inside the stator 300.

The stator 300 is disposed outside the rotor 200. The stator 300 may include a stator core 310, an insulator 320 mounted on the stator core 310, and a coil 330. The coil 330 may be wound around the insulator 320. The insulator 320 is disposed between the coil 330 and the stator core 310 to serve to electrically insulate the stator core 310 and the coil 330 from each other. The coil 330 induces an electrical interaction with a magnet of the rotor 200.

A bearing 400 is fixed to the housing 600. The bearing 400 rotatably supports a shaft guide 500.

The shaft guide 500 serves to support the bearing 400 and the spindle entering the inner side of the shaft 100 together. The shaft guide 500 is coupled to an end portion 120 of the shaft 100. The shaft guide 500 is disposed around a bottom surface of the housing 600. The shaft guide 500 is in contact with an inner ring 410 (see FIG. 7) of the bearing 400.

The stator 300 and the rotor 200 are disposed inside the housing 600. In addition, the shaft guide 500 is disposed inside the housing 600.

FIG. 2 is a view illustrating the shaft 100 illustrated in FIG. 1, and FIG. 3 is a side cross-sectional view illustrating the shaft 100 along line A-A of FIG. 2.

Referring to FIGS. 2 and 3, the shaft 100 may include a central portion 110 and the end portion 120 having different outer diameters. The end portion 120 of the shaft 100 is a region coupled to the shaft guide 500. The outer diameter of the end portion 120 of the shaft 100 may be smaller than the outer diameter of the central portion 110.

FIG. 4 is a perspective view illustrating the shaft guide 500 illustrated in FIG. 1, and FIG. 5 is a side cross-sectional view along line A-A of FIG. 4. FIG. 6 is a plan view illustrating the shaft guide 500 illustrated in FIG. 4, and FIG. 7 is a side cross-sectional view around the shaft guide 500.

Referring to FIGS. 4 to 7, the shaft guide 500 includes an outer surface and an inner surface. The outer surface of the shaft guide 500 may include a first surface S1 and a second surface S2. The first surface S1 is a surface in contact with the inner ring 410 (see FIG. 7) of the bearing 400 and may be a part of an outer circumferential surface of the shaft guide 500. The second surface S2 is a surface in contact with one surface of the inner ring 410 (see FIG. 7) of the bearing 400 and may be formed in a radial direction to form a stepped surface of the first surface S1.

The shaft guide 500 may include a first groove 510 and a second groove 520 forming the inner surface. The first groove 510 may include a first region 511 and a second region 512 disposed in an axial direction. An inner diameter D1 of the first region 511 is greater than an inner diameter D2 of the second region 512.

The first region 511 may include a 1-1 region 511a and a 1-2 region 511b. The 1-1 region 511a forms a space into which the shaft 100 is press-fitted. An inner diameter D11 of the 1-1 region 511a corresponds to an outer diameter SD2 of the shaft 100. An inner diameter D12 of the 1-2 region 511b is smaller than the outer diameter SD2 of the shaft 100.

The first groove 510 may include a third surface S3 and a fourth surface S4 forming the 1-1 region 511a.

The third surface S3 is a part of an inner circumferential surface of the shaft guide 500 and corresponds to a region in contact with an outer surface of the end portion 120 of the shaft 100. The fourth surface S4 is a part of the inner surface of the shaft guide 500 and may be formed in the radial direction to form a stepped surface of the third surface S3. The fourth surface S4 corresponds to a region in contact with an end surface of the shaft 100. The fourth surface S4 serves to determine a position of the shaft 100 in the axial direction and support the shaft 100 in the axial direction when the shaft 100 is coupled to the shaft guide 500.

Meanwhile, the inner diameter D12 of the 1-2 region 511b is greater than an inner diameter of the shaft 100. And the inner diameter D1 of the first region 511 is smaller than an outer diameter BD2 of the bearing 400. The inner diameter D1 of the first region 511 is greater than an inner diameter BD1 of the bearing 400. The inner diameter D2 of the second region 512 is smaller than the inner diameter BD1 of the bearing 400.

The second groove 520 may be formed to be concave from a bottom surface 513 of the second region 512 of the first groove 510. The second groove 520 is a region to which the spindle of the external device is connected. The second groove 520 includes a plurality of sidewalls 521, and the sidewalls 521 may be disposed to form angles therebetween. For example, when viewed in the axial direction, the second groove 520 may have a polygonal shape. FIG. 7 is a side cross-sectional view around the shaft guide 500.

Referring to FIG. 7, the shaft 100 is coupled to the inner side of the shaft guide 500, and the bearing 400 is fixed to an outer side of the shaft guide 500. An inner circumferential surface and one surface of the inner ring 410 of the bearing 400 are in contact with the outer surface of the shaft guide 500. An outer circumferential surface and the other surface of an outer ring of the bearing 400 may be in contact with the housing.

The end portion 120 of the shaft 100 is positioned inside the shaft guide 500 and is disposed to overlap the housing 500 in the radial direction. The second groove 520 connected to the spindle of the external device is disposed to overlap the bearing 400 in the radial direction.

As described above, as the outer surface of the shaft guide 500 is used as a region which supports the bearing 400 and the inner surface of the shaft guide 500 is used as a structure which supports the spindle of the external device, there is an advantage that a structure which supports the spindle of the external device can be easily formed. In addition, since a component which supports the bearing 400 is equal to a component which supports the spindle of the external device, there are advantages that stiffness is improved and management is easy.

The above-described embodiment can be used in various devices for vehicles or home appliances.

The invention claimed is:

1. A motor comprising:
    a shaft;
    a rotor coupled to the shaft;
    a stator disposed to correspond to the rotor;
    a bearing which supports the shaft; and
    a shaft guide which supports the bearing,
    wherein
        the shaft guide includes a first groove in which the shaft is disposed,
        an outer surface of the shaft guide includes a first surface and a second surface,
        the first surface is in contact with an inner circumferential surface of an inner ring of the bearing,
        the second surface is in contact with one surface of the inner ring of the bearing, and
        the shaft guide includes a second groove which is disposed in a bottom surface of the first groove,
    wherein the shaft is coupled to the inner side of the shaft guide and the bearing is fixed to an outer side of the shaft guide, and
    wherein the second groove is connected to an axis of an external device that enters an inner side of the shaft.

2. The motor of claim 1, wherein the first groove includes a third surface in contact with an outer surface of the shaft and a fourth surface in contact with an end surface of the shaft.

3. The motor of claim 1, wherein:
    the first groove includes a first region and a second region which are disposed in an axial direction;

the first region is greater than an inner diameter of the bearing; and the second region is smaller than the inner diameter of the bearing.

4. The motor of claim 3, wherein:

the first region includes a 1-1 region and a 1-2 region which are disposed in the axial direction;

an inner diameter of the 1-1 region corresponds to an outer diameter of the shaft; and an inner diameter of the 1-2 region is smaller than the outer diameter of the shaft.

5. The motor of claim 4, wherein the inner diameter of the 1-2 region is greater than an inner diameter of the shaft.

6. The motor of claim 3, wherein an outer diameter of the first region is smaller than an outer diameter of the bearing.

7. The motor of claim 1, wherein the second groove is disposed to overlap the bearing in a radial direction.

8. The motor of claim 1, wherein:

the second groove includes a plurality of sidewalls; and the plurality of the sidewalls are disposed to form angles therebetween.

9. The motor of claim 1, further comprising a housing disposed outside the stator, wherein the housing is in contact with an outer circumferential surface and the other surface of an outer ring of the bearing.

* * * * *